United States Patent [19]

Tivy

[11] Patent Number: 4,815,591
[45] Date of Patent: Mar. 28, 1989

[54] OIL CHANGE CONTAINER

[76] Inventor: Michael B. Tivy, 2045 N.E. 24th Ave. Apt. 21, Pompano Beach, Fla. 33062

[21] Appl. No.: 191,376

[22] Filed: May 9, 1988

[51] Int. Cl.$^4$ .................. B65D 81/36; F16N 31/00
[52] U.S. Cl. ........................... 206/223; 141/98; 184/106; 206/511; 220/1 C; 220/23.6; 220/23.83; 220/94 A
[58] Field of Search ................ 141/98, 333, 334; 184/1.5, 106; 206/223, 509, 511; 220/1 C, 94 A, 23.83, 23.6

[56] References Cited

U.S. PATENT DOCUMENTS

| | | | |
|---|---|---|---|
| 3,406,855 | 10/1968 | McKechnie | 206/509 |
| 3,407,961 | 10/1968 | Box | 206/511 |
| 3,424,334 | 1/1969 | Goltz | 206/511 |
| 3,616,943 | 11/1971 | Brink | 206/511 |
| 3,732,955 | 5/1973 | Carter et al. | 206/223 |
| 3,741,433 | 6/1973 | Bentley et al. | 220/94 A |
| 4,098,398 | 7/1978 | Meyers | 206/223 |
| 4,485,924 | 12/1984 | Ripoll et al. | 206/511 |
| 4,524,866 | 6/1985 | Pollacco | 206/223 |
| 4,533,042 | 8/1985 | Pollacco | 206/223 |
| 4,756,411 | 7/1988 | Garland | 206/223 |

FOREIGN PATENT DOCUMENTS

| | | | |
|---|---|---|---|
| 0295736 | 4/1932 | Italy | 220/94 A |
| 0960491 | 6/1964 | United Kingdom | 206/511 |
| 1116049 | 6/1968 | United Kingdom | 206/509 |

Primary Examiner—Jimmy G. Foster
Attorney, Agent, or Firm—Harry W. Barron

[57] ABSTRACT

An oil change kit container holds packages of new oil to be purchased and, after the new oil is removed, holds the used oil and used filter removed from the vehicle and facilitates the collection and reprocessing of the used oil. The container includes a large recessed opening on the top through which the packages of oil are removed and into which the oil exiting the crankcase flows. The opening is sufficiently large to permit the container to be set below the oil plug and not be moved during the draining of the oil. The container also includes an indent to hold the new oil packages firm within the container during transit. A handle is provided in association with the indent for carrying the container. The container also includes feet on the bottom and feet receptacles on the top for permitting the containers to be easily stacked. The container is made entirely of plastic by conventional molding techniques.

10 Claims, 2 Drawing Sheets

OIL CHANGE CONTAINER

This invention relates to an oil change kit, and more particularly, to such a kit having a container for initially holding the oil necessary to change oil in a vehicle and for thereafter being used as a receptacle for the used oil removed from the vehicle.

Every year, millions of people change the oil in their personal vehicle. Major ecological problems have been created as the result of the do-it-yourself mechanic who has no convenient manner of disposing of the used oil. In many instances, the do-it-yourself mechanic removes the used oil from the vehicle and allows it to settle into the ground or to flow into storm sewers. This oil flowing into the environment creates water pollution and other environmental problems which, if not controlled, could permanently destroy the environment.

Used oil, which is removed from the crank case of a vehicle during an oil change, can be reprocessed and reused and because of the limited amount of crude oil available, reprocessing and reusing of oil must be encouraged. In order to reprocess and reuse crank case oil, a simple and economical container must be provided for the do-it-yourself mechanic. Such a container must be inexpensive, disposable, simple to use, capable of storage at collection points and provided in such a manner so as to encourage its use.

Whenever a do-it-yourself mechanic changes oil, the first thing which must be done is to purchase the oil. Typically, a vehicle requires four or five quarts of oil for each oil change. If a container useful for containing the old oil is provided as a convenient package for the new oil being purchased, the do-it-yourself mechanic will have satisfied both of his needs with a single purchase, that is purchasing the new oil and purchasing the container for the old oil. In addition, the combining of the new oil and a convenient package/container is a first step in encouraging the do-it-yourself mechanic to collect the old oil.

A desirable oil change kit container must have several attributes if it is going to be used by the do-it-yourself mechanic to collect the old oil. First, it must hold the four or five quarts of separately packaged new oil required for an oil change and the new oil must be easily removable prior to beginning to change the oil. The kit container must further have a sufficiently large opening therein to permit the old oil to flow therein from the crank case without spilling on the ground adjacent to the container and the opening must have a removable cover. Lastly, the container must be made stackable so that when the do-it-yourself mechanic takes the container of old oil to a central depository, it can be stacked, along with many other similar containers, in a convenient place without a fear of the stacked containers falling.

Many attempts have been made in the past to provide containers for receiving used oil from the crank case of a vehicle. Of these containers, many are useful only for containing the used oil, such as those disclosed in U.S. Pat. Nos. 4,673,081, 4,488,584, 4,557,395, 4,697,670 and U.S. Pat. No. Re. 27,449. Other patents, such as U.S. Pat. Nos. 4,301,841, 4,403,692, 4,513,865, 4,098,398 and 4,296,838, disclose a system in which a the container is used for both containing the new oil and as a receptacle for the used oil. Of those latter containers described in the aforementioned U.S. Patents, the ones in U.S. Pat. Nos. 4,301,841 and 4,513,865 constitute a single container which is purchased with new oil and reused the next time the oil is changed. Adding the new oil using this bulk container is difficult and oil spills on the engine are common. Thus, the container must remain in the vehicle owners garage, or other storage area, during the time between oil changes. Furthermore, all of the oil may not be used during a single oil change, particularly for foreign vehicles which use four quarts of oil and not the more common five quarts. Other of the containers, such as those described in U.S. Pat. No. 4,403,692, include a very complex dual container system. This greatly increases the cost for the do-it-yourself mechanic, thereby discouraging the collection of the used oil.

U.S. Pat. No. 4,089,398 discloses a conventional six entry cardboard case for holding five quart cans of oil and a balloon used for collecting the used oil. This system is difficult to use for collecting the used oil because of the entry in which oil flows out of the crank case and therefore impractical. Finally, U.S. Pat. No. 4,296,838 discloses two separate containers attached together, which again is expensive for the user.

In accordance with one aspect of this invention there is provided a package for containing new oil and useful for storing the used oil being replaced during an oil change for a vehicle including a molded plastic member sized to hold a plurality of prepackaged new oil containers. The member includes an opening and has at least one formed support therein to maintain the new oil containers stationary. The opening is positioned over at least one of the new oil containers and sized to be larger than the new oil container and sufficiently large to permit the replaced oil exiting the vehicle to flow into the member without moving the member, after initially positioning the member. The package further includes a removable cover for the opening, a plurality of feet extensions on the bottom of the container and a plurality of feet receptacles on the top of the container positioned and sized to receive the corresponding feet of another container.

One preferred embodiment of the subject invention is hereafter described with specific reference being made to the following Figures in which FIG. 1 is a perspective view of the container of the subject invention;

Figure 1:
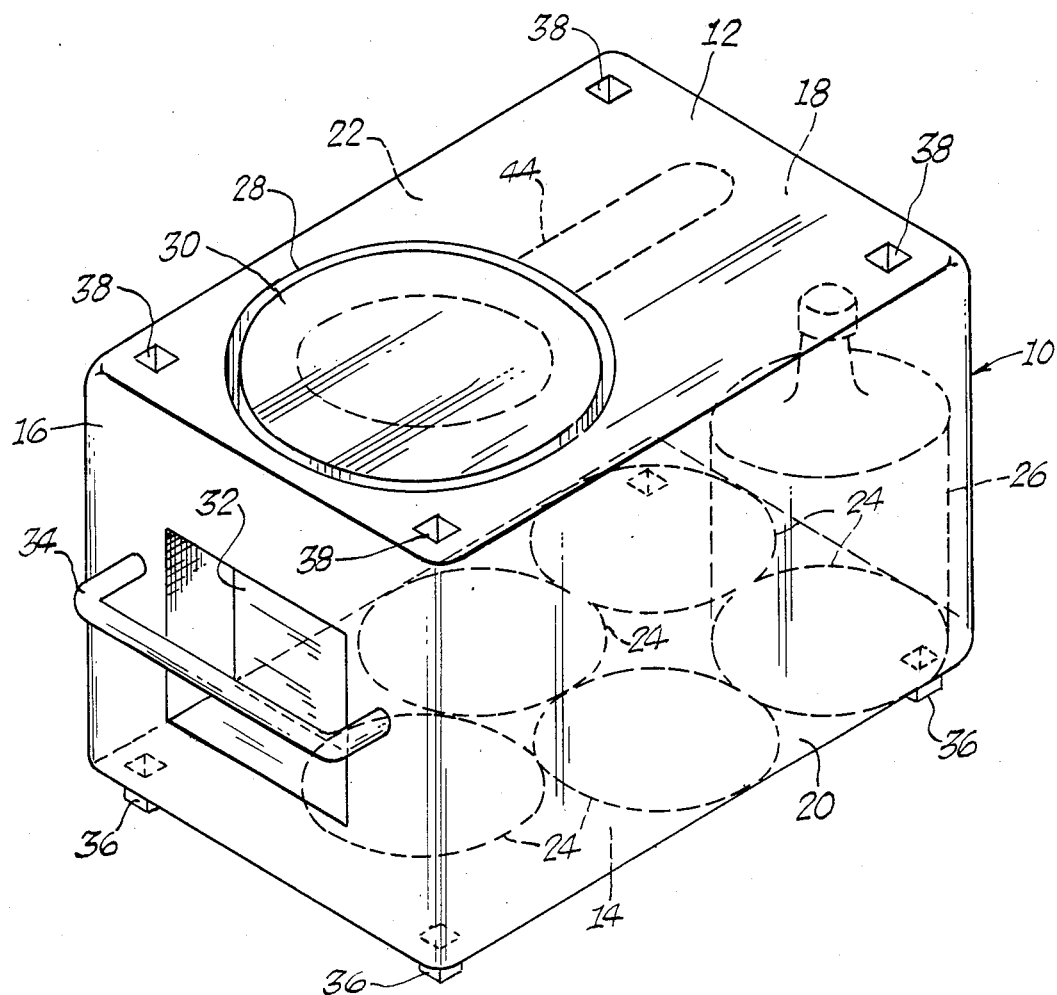

Referring now to FIG. 1, a perspective view of the container 10 of the subject invention is shown. Container 10, which may be fabricated of blown plastic material, includes a top 12, bottom 14, front 16, back 18 and sides 20 and 22. Container 10 is sized to be able to hold five quarts of oil, as shown by the dashed circles 24 in FIG. 1. The five quarts of oil may be, for example, round plastic bottles 26, only one of which is shown, and should fit within container 10 so as not to be moveable duringtransit. It should be understood that plastic bottle 26 is only exemplary of a container for new oil. Oil alternatively may be packaged in square or rectangular bottles or in the conventional round can and where this is done, the size of container 10 must be adjusted based on the actual size of the particular container 26 selected, in order to maintain the containers 26 in an immovable position.

Top 12 of container 10 includes a large opening 28, which may be recessed and covered by a cap 30. The amount of the recess of opening 28 is such that the top of cap 30 is on the same plane, or below the plane, of top 12. The reason for this is to permit a plurality of containers 10 to be stacked upon one another, as described hereafter. The size of opening 28 must be sufficiently large so as to permit an oil container 26, when held by the hand of the mechanic, to be easily removed from within container 10. Thus, opening 28 is larger than the diameter of oil container 26.

In addition, opening 28 must be sufficiently large so that the oil exiting the crank case of the vehicle enters container 10 without the necessity of moving container 10. The path of the oil exiting the crankcase will vary depending upon the amount of oil remaining in the crankcase. Initially, the oil follows a path away from the oil plug, which path continually moves closer to the plug as more and more oil is drained. Thus, opening 28 should be sufficiently long to cover the entire path change of the exiting oil. For example, opening 28 may be approximately 6 inches in diameter.

Front 16 of container 10 includes an indent 32 and a handle 34. Indent 32 extends inward to maintain the oil container 26-5, shown in FIGS. 2 and 3, positioned firmly against oil containers 23-3 and 26-4 and below opening 28. By providing indent 32 the five oil containers 26, shown by the circles 24 in FIG. 1 are held firmly in place within container 10 and can not move.

Handle 34 is provided for the convenience of the purchaser in carrying container 10 including the five quarts of oil after purchasing. Handle 34 may be positioned across indent 32 in order to provide room for the hands of the purchaser and minimize the amount handle 34 extends outwardly. Alternatively handle 34 may be within and across indent 32 in order to save space.

In order to permit stacking of several containers 10, both during the retail sale thereof as well as at a depository for the used oil, four feet 36 are provided on the bottom 14 and four corresponding indents 38 are provided on the top 12 of container 10. Feet 36 and indents 38 are sized and positioned with respect to another such that the feet 36 fit within the indents 38. This permits a secure stacking of several containers 10.

Figure 2:
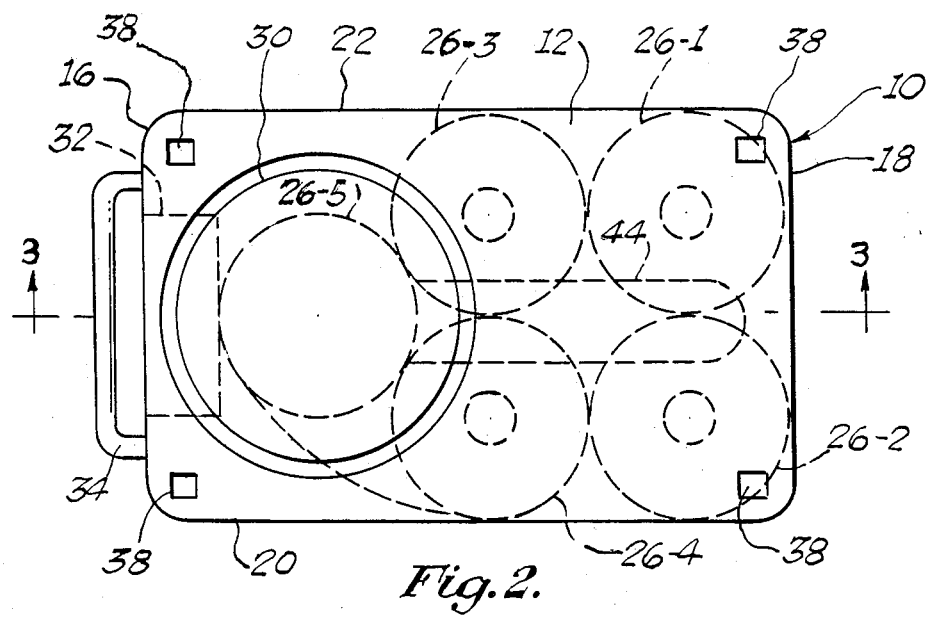
FIG. 2, is a top view of the container of the subject invention.
Figure 3:
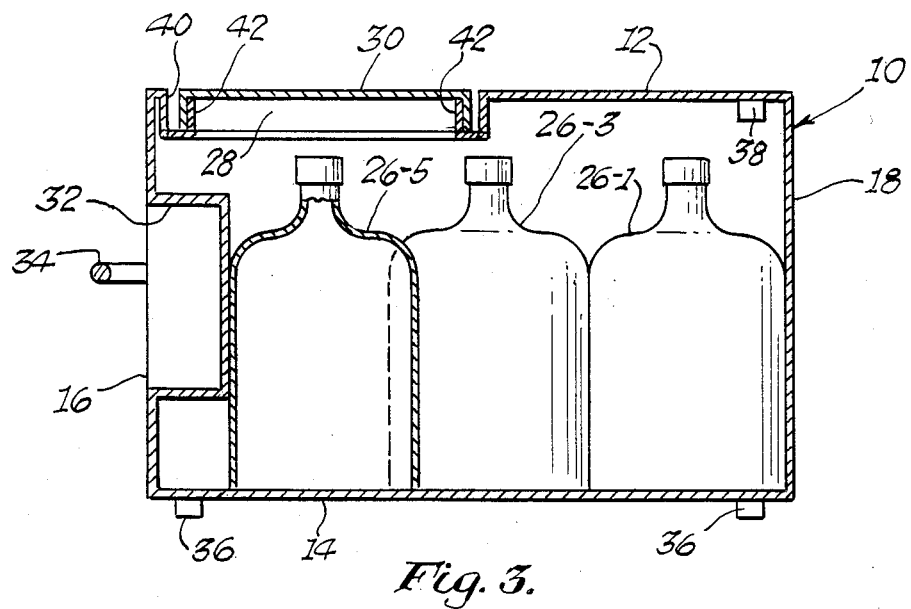
FIG. 3, is a view across lines 3—3 of FIG. 2 of the container of the subject invention.

Referring now to FIGS. 2 and 3, certain additional details of the constructions of oil container 10 are shown. In FIGS. 2 and 3 like numerals are used for like components with respect to that shown in FIG. 1.

As seen in FIG. 2, five bottles of oil 26-1 through 26-5 are positioned within container 10. Bottles 26-1 through 26-4 are positioned in a 2×2 contacting matrix against the back 18 and sides 20 and 22 of container 10. Bottle 26-5 is positioned between bottles 26-3 and 26-4 and indent 32. As seen best in FIGS. 2 and 3, bottles 26-5 is held firmly at three positions thereof to prevent movement, that is at its contact point with bottles 26-3 and 26-4 and at its contact point with indent 32. Thus, indent 32, together with the back 18 and sides 20 and 22 of container 10, hold bottles 26-1 through 26-5 firmly together in order to prevent movement thereof during transit. It is important that the bottles 26-1 through 26-5 are not too firmly held together since the bottles must be moved into the position initially occupied by bottle 26-5 and removed through opening 28.

Referring to specifically to FIG. 3, the manner in which opening 28 and cap 30 are constructed is shown. Opening 28 is within the recessed area 40. Extending upward around opening 28 is a ridge 42 to which cap 30 is affixed. Cap 30 may be affixed to ridge 42 by either rotating around threads positioned inside cap 32 and on the outer side of ridge 42, or cap 30 may be snap fit on ridge 42. The physical size of recessed area 42 should be sufficient so that ridges 42 and cap 30 do not extend above the plane of top 12, in order to permit stacking of several containers 10.

In using the oil change kit defined by container 10, the following procedure is followed. First, the entire container containing five quarts of oil is purchased at a retail establishment. When the purchaser desired to change the oil in his vehicle, cap 30 is removed and the five quarts of oil 26-1 through 26-5 are removed, one at a time through, opening 28. If only four quarts are needed for the oil change, the fifth quart is saved for future use to add oil. Alternatively, one of the containers may be a dummy container, or the size and shape of container 10 may be modified to hold only four quarts containers of oil. Opening 28 must be sufficiently large to permit the hand of the purchaser to extend into container 10 and retrieve the furthest oil bottles 26-1 and 26-2 and slide them into position to be removed through opening 28.

After the new oil containers 26-1 and 26-5 are removed, container 10 is positioned beneath the oil plug of the vehicle and the oil plug is removed. The preferred positioning is when the oil plug is directly above the outer edge of opening 28. The old oil then flows through opening 28 into container 10. Because of the varying amount of oil in the crankcase, and thus the varying pressure at the oil plug, the flow pattern of the oil will go from the opposite side of opening 28 to the side thereof beneath the oil plug, as the amount of oil in the crank case becomes less and less. The size of opening 28, thus, must be sufficient to accommodate this change in the flow path of the oil exiting the crank case. Further, the size of opening 28 should be sufficient to receive the used oil filter.

After all of the oil has been removed from the crank case, the oil plug is reinserted and the oil in containers 26-1 through 26-5 is poured into the engine. Container 10, is then removed from beneath the car, the oil filter is placed in container 10, cap 30 is repositioned to cover opening 28 and container 10 is taken to a disposal facility, such as a local service station. At the service station, container 10 can be stack with other similar container 10 deposited by other users by inserting feet 36 into the corresponding openings 38 of the previous deposited container 10.

Container 10 may be manufactured entirely of plastic by conventional blow molding techniques, As such, container 10 becomes a very inexpensive item and because of the convenience afforded and the immediate usability of all parts of the oil change kit, the slight additional cost of container 10 is out weighed by the benefits. This will encourage the do-it-yourself mechanic to use container 10 to contain and deposit the used oil.

It should be understood that while circular bottles of oil have been shown and described herein, other shape are commonly used, such as square or rectangular. Minor adjustment in the physical size according to the teachings herein above stated may be made to the container 10 to accommodate other types of new oil packages. Further, opening 28 has been shown as circular, but may be oval, rectangular or any other shape. This is particularly true where cap 30 snaps fits over ridges 42. Additionally, a slot opening, such as shown by dashed lines 44 in FIG. 2, may extend back from opening 28 to provide additional length for the oil stream, if required, particularly for raised suspension vehicles or other vehicles higher than normal above the ground.

What is claimed is:

1. A oil change package for containing packages of new oil to be removed and for thereafter storing the used oil being replaced during an oil change for a vehicle comprising:
   a molded plastic member sized to hold a plurality of prepackaged new oil containers, said member including an opening and further having at least one formed support therein to maintain said new oil containers stationary, said opening being positioned over at least one of said new oil containers and sized to be larger than said new oil container and sufficiently large to permit the replaced oil exiting said vehicle to flow into said member without moving said member, after initially positioning said member;
   a removable cover for said opening;
   a plurality of feet extensions on the bottom of said container; and
   a plurality of feet receptacles on the top of said container positioned and sized to receive the corresponding feet of another container.

2. The invention according to claim 1 wherein said member includes a handle.

3. The invention according to claim 2 wherein said formed support is an indent from the outer surface of said member and said handle is positioned across said formed support indent.

4. The invention according to claim 1 wherein said opening is formed in a recess on the top of said member.

5. The invention according to claim 4 wherein said member has a width of twice the width of a packaged new oil container.

6. The invention according to claim 5 wherein said member includes a handle.

7. The invention according to claim 6 wherein said formed support is an indent from the outer surface of said member and said handle is positioned across said formed support indent.

8. The invention according to claim 1 wherein said formed support is an indent from the outer surface of said member and said handle is positioned across said formed support indent.

9. The invention according to claim 8 wherein said member is sized to hold five round packages of new oil, four of which are positioned in a 2×2 matrix between the back and two sides of said member and the fifth of which is positioned between said matrix and said formed support.

10. The invention according to claim 1 wherein said opening includes an elongated slot.

* * * * *